United States Patent [19]

Lee et al.

[11] Patent Number: 5,028,389
[45] Date of Patent: Jul. 2, 1991

[54] HYDROGEN STORAGE MATERIALS OF ZR-TI-CR-FE

[75] Inventors: Jai Young Lee; Jong Man Park, both of Seoul, Rep. of Korea

[73] Assignee: Korea Advanced Institute of Science and Technology, Seoul, Rep. of Korea

[21] Appl. No.: 496,360

[22] Filed: Mar. 20, 1990

[30] Foreign Application Priority Data

May 17, 1989 [KR] Rep. of Korea ............ 6599/1989[U]

[51] Int. Cl.$^5$ .......................... C22C 30/00; C10B 6/00
[52] U.S. Cl. .................... 420/422; 420/900; 423/644
[58] Field of Search ................. 420/422, 900; 423/644

[56] References Cited

U.S. PATENT DOCUMENTS

| | | | |
|---|---|---|---|
| 4,412,982 | 11/1983 | Wallace et al. | 420/900 |
| 4,556,551 | 12/1985 | Wallace et al. | 423/644 |
| 4,656,023 | 4/1987 | Wallace et al. | 423/644 |

*Primary Examiner*—Upendra Roy
*Attorney, Agent, or Firm*—Darby & Darby

[57] ABSTRACT

Quarternary alloys of the formula: $Zr_{1-x}Ti_xCr_{1-y}Fe_{1+y}$ are provided, which are characterized as having C14 hexagonal Laves phase wherein "x" has a value between 0.05 and 0.1 and "y" has a value of 0 to 0.4. These alloys, have P-C-T relations with low hysteresis and flat plateaux, are suitable for various applications such as hydrogen storage and hydride heat pump system.

2 Claims, 3 Drawing Sheets

HYDROGEN STORAGE MATERIALS OF ZR-TI-CR-FE

BACKGROUND OF THE INVENTION

The present invention relates to materials for hydrogen storage which are characterized by C14 hexagonal crystal structure and $ZrCr_2$ stoichiometry.

It is well-known that the $AB_2$ Laves phase alloys (A:Zr, B:V, Cr,Mn) show considerable promise as a hydrogen storage material because of its large hydrogen absorption capacity and rapid reaction rate with hydrogen. An article entitled "Storing Hydrogen in $AB_2$ Laves-Type Compounds" by D.O. Northwood et al. (Z. Phys Chem. N.F., 147, 191–209, 1986) discloses that $ZrV_2$, $ZrCr_2$ and $ZrMn_2$ alloy systems are capable of absorbing large quantities of hydrogen but its hydrides are too stable to be of practical significance. Therefore, many studies performed so far have paid attention to increase the vapor pressure of the alloy without markedly reducing the hydrogen storage capacity by partial substitution of the A or B elements by other elements (Ti,Cr, Mn,Fe etc.). In many cases, titanium and iron have been used for A and B element substitution, respectively. In search of improved $ZrCr_2$ type systems for hydrogen storage, ternary or quarternary alloys with $ZrCr_2$ stoichiometry have been developed. For example, in Shaltiel et al., J.Less-Comm.Metals, 73,369–376 (1980), there are described new alloys with the empirical formula $Zr_{1-x}Ti_xB_2$ wherein $B=Cr,Mn$ and in Northwood et al., J.Less-Comm.Metals, 147, 149-159 (1989), compounds with the formula $Zr(Fe_xCr_{1-x})_2$. Quarternary allows consisting of zirconium, titanium, chromium and iron, represented by the empirical formula $Zr_{1-x}Ti_xCr_{2-y}Fe_y$ are provided by Wallace et al., U.S. Pat. No. 4,556,551, wherein "x" has a value in a range from 0.0 to 0.9 and "y" has a value of 0.1 to 1.5. Wallace et al. also provided alloys of particular interest for hydrogen storage within the above scope as $ZrCr_{0.6}Fe_{1.4}, Zr_{0.8}Ti_{0.2}Cr_{0.6}Fe_{1.4}, Zr_{0.7}Ti_{0.3}Cr_{0.6}Fe_{1.4}$ and $Zr_{0.8}Ti_{0.2}Cr_{0.7}Fe_{1.3}$ by showing desorption pressure-composition-isotherm curves of these alloys.

However, in Suda et al., J.Less-Comm. Metals, 89,269–274 (1983), the use of cyclic hydroding-dehydriding reactions for various applications, e.g. in heat pump systems as well as hydrogen storage, requires accurate control of P-C-T relations, hysteresis and plateau slopes. It is thus important to find to Laves phase alloys with such low hysteresis and flat plateaux.

SUMMARY OF THE INVENTION

The present invention is based on the discovery that in the zirconium-titanium-chromium-iron alloy system, improved hydrogen storage materials are provided with having the C14 hexagonal crystal structure and $ZrCr_2$ stoichiometry. A representative family of such alloys is expressed as following empirical formula $$Zr_{1-x}Ti_xCr_{1-y}Fe_{1+y}$$

wherein "x" has a value in a range from 0.05 to 0.1 and "y" has a value of 0.0 to 0.4. All of the alloys within above composition range are characterized by thermodynamic properties with low hysteresis and flat plateaux. Alloys of the invention are thus very useful in various applications such as hydrogen storage, hydride heat pump, compressor etc.

DESCRIPTION OF PREFERRED EMBODIMENTS

Figure 1:
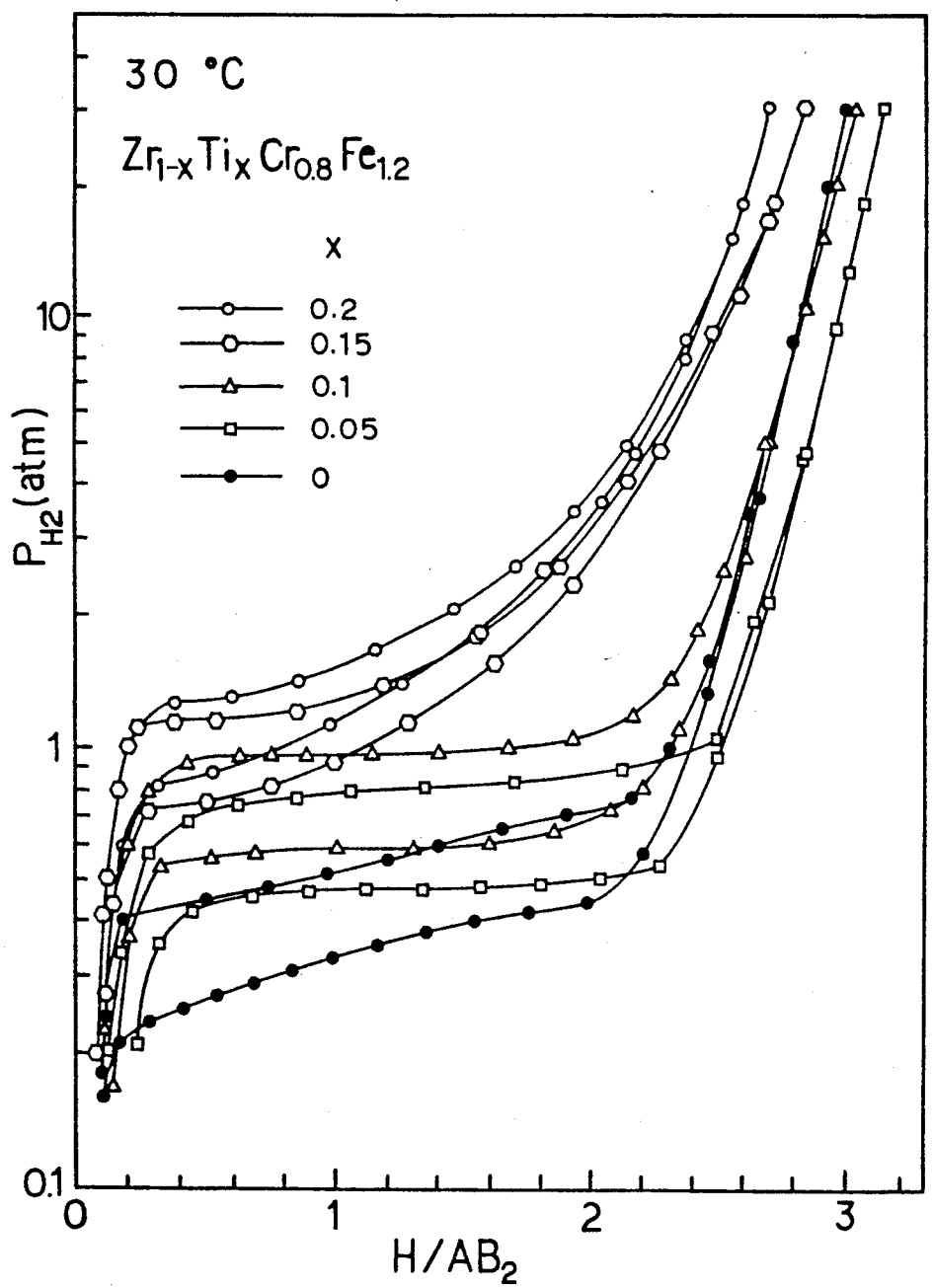
FIG. 1. shows pressure-composition-isotherms for $Zr_{1-x}Ti_xCr_{0.8}Fe_{1.2}$ alloys at 30° C.

Alloys of the invention are characterized generally as zirconium-based Laves phase intermetallic compounds composed of four elements (A=Zr,Ti; B=Cr,Fe) in a C14 hexagonal crystal structure. The compound is further characterized in being a $ZrCr_2$-based alloy in which 5–10% of zirconium must be replaced by titanium, and more than a half of chromium is replaced by iron, in a manner to maintain, substantially, the $ZrCr_2$ stoichiometry. The lattice parameters of such alloys, expressed by the empirical formula: $Zr_{1-x}Ti_xCr_{1-y}Fe_{1+y}$, have approximate values in the following ranges:

a=4.988 to 5.023 Å
c=8.167 to 8.233 Å

The procedures for the preparation of these alloys are as follows. Weighed amount of the zirconium (purity: 99.7%), titanium (99.99%), chromium (99.9%), and iron (99.9%) were placed into an Arc melting apparatus in 1 atm argon atmosphere. Fusing of the constituents takes place by Arc melting a mixture of these constituents in about thirty seconds. Then the sample was cooled to room temperature. The ingots were turned over and remelted several times to ensure homogeniety of the alloy. Thereafter the ingots were heat treated for a period of about 24 hours at 900–1000° C. X-ray diffraction analysis of the annealed sample typically shows a homogeneous single C14 type of Laves phase. About 1 g of the sample, with initial size, $-100+325$ mesh, was loaded into a copper tube pressure reactor vessel suitable for use in forming a hydride of the sample. A high pressure Sievert's-type apparatus was used for charging the hydrogen to the sample. The activation was performed by charging hydrogen with 30–40 atmosphere and discharging, at least five times, at room temperatures. Hereafter the isotherm of the hydrogen pressure versus the composition was measured at ambient temperature.

In order to demonstrate the alloys of the invention, ten quarternary and one ternery alloy containing varing amounts of four constituent elements were actually prepared in accordance with the aforementioned procedures. Essential parameters such as lattice parameters, storage capacity, equilibrium pressures, and hydrogenation characteristics were summarized in Tables I and II.

TABLE I

Lattice Parameters and Hydrogen Storage Data for 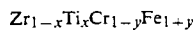 $Zr_{1-x}Ti_xCr_{0.8}Fe_{1.2}$ Alloys

| Sample No. | 1 | 2 | 3 | 4 | 5 |
|---|---|---|---|---|---|
| Composition (x) | 0 | 0.05 | 0.1 | 0.15 | 0.2 |
| Lattice Parameter | | | | | |
| a(Å) | 5.020 | 5.016 | 5.021 | 5.002 | 4.992 |
| C(Å) | 8.214 | 8.217 | 8.229 | 8.197 | 8.178 |
| Capacity (H/AB$_2$) at 30° C., $P_{H_2} = 30$ atm | 3.05 | 3.15 | 3.04 | 2.85 | 2.71 |

TABLE I-continued

Lattice Parameters and Hydrogen Storage Data for
$Zr_{1-x}Ti_xCr_{0.8}Fe_{1.2}$ Alloys

| Sample No. | 1 | 2 | 3 | 4 | 5 |
|---|---|---|---|---|---|
| Equilibrium Pressure at 30° C. | | | | | |
| $P_a$(atm) | 0.52 | 0.79 | 0.97 | 1.26 | 1.5 |
| $P_d$(atm) | 0.36 | 0.47 | 0.58 | 0.92 | 1.23 |
| Enthalpy Change $\Delta H$(Kcal/mol $H_2$) | | | | | |
| abs. | −6.91 | −6.76 | −6.75 | −6.61 | −6.29 |
| des. | 7.88 | 7.78 | 7.75 | 7.20 | 7.33 |
| Entropy Change $\Delta S$(cal/mol $H_2 \cdot$ K) | | | | | |
| abs. | −21.5 | −21.9 | −22.3 | −22.3 | −22.6 |
| des. | 23.7 | 24.3 | 24.9 | 23.6 | 24.4 |
| Hysteresis Factor $\frac{1}{2}RT\ln(P_a/P_d)$ at 30° C. | 138 | 169 | 152 | 93 | 78 |
| Degree of Sloping $d\ln(P_a)/d(H/AB_2)$ | 0.45 | 0.2 | 0.09 | 1.03 | 1.10 |

TABLE II

Lattice Parameters and Hydrogen Storage Data for
$Zr_{0.9}Ti_{0.1}Cr_{1-y}Fe_{1+y}$ Alloys and
$Zr_{0.8}Ti_{0.2}Cr_{0.6}Fe_{1.4}$ Alloy

| Sample No. | 6 | 7 | 8 | 9 | 10 | 11* |
|---|---|---|---|---|---|---|
| Composition (y) | 0 | 0.1 | 0.2 | 0.3 | 0.4 | |
| Lattice Parameter | | | | | | |
| a(Å) | 5.016 | 5.007 | 5.021 | 5.002 | 4.992 | 4.988 |
| c(Å) | 8.214 | 8.204 | 8.229 | 8.197 | 8.184 | 8.172 |
| Capacity (H/AB$_2$) at 30° C., $P_{H2}$ = 30 atm | 3.10 | 3.10 | 3.06 | 3.04 | 2.84 | 2.42 |
| Equilibrium Pressure at 30° C. | | | | | | |
| $P_a$(atm) | 0.271 | 0.5 | 0.97 | 1.9 | 3.815 | 5.95 |
| $P_d$(atm) | 0.185 | 0.316 | 0.58 | 1.055 | 2.037 | 3.97 |
| Enthalpy Change $\Delta H$(Kcal/mol $H_2$) | | | | | | |
| abs. | −7.5 | −7.09 | −6.75 | −5.99 | −5.87 | |
| des. | 8.61 | 8.30 | 7.75 | 7.66 | 7.12 | |
| Entropy Change $\Delta S$(cal/mol $H_2 \cdot$ K) | | | | | | |
| abs. | −22.2 | −22.0 | −22.3 | −21.0 | −22.0 | |
| des. | 25.1 | 25.1 | 24.9 | 25.4 | 24.9 | |
| Hysteresis Factor $\frac{1}{2}RT\ln(P_a/P_d)$ at 30° C. | 115 | 138 | 152 | 178 | 189 | 122 |
| Degree of Sloping $d\ln(P_a)/d(H/AB_2)$ | 1.191 | 0.18 | 0.09 | 0.09 | 0.1 | 0.44 |

*The composition of alloy (sample No. 11) is $Zr_{0.8}Ti_{0.2}Cr_{0.6}Fe_{1.4}$

FIG. 1 shows the change of pressure-composition-isotherm (P-C-T) curves of hydrogen absorption and desorption for $Zr_{1-x}Ti_xCr_{0.8}Fe_{1.2}$ alloys at 30° C. with increasing titanium concentration (x=0, 0.05, 0.1, 0.15 and 0.2). It can be seen that the replacement of a little zirconium by titanium reduces the slope of plateau pressure at low concentration range $0 \leq x < 0.1$. A well-defined plateau pressure with lower plateau slope is formed only at the critical concentration x=0.1. Further increase of the titanium composition above x=0.1, even a small increase to x=0.15, leads to an abrupt change of plateau slope in which no distinct plateau region exists and to a lower hydrogen capacity.

Figure 2:
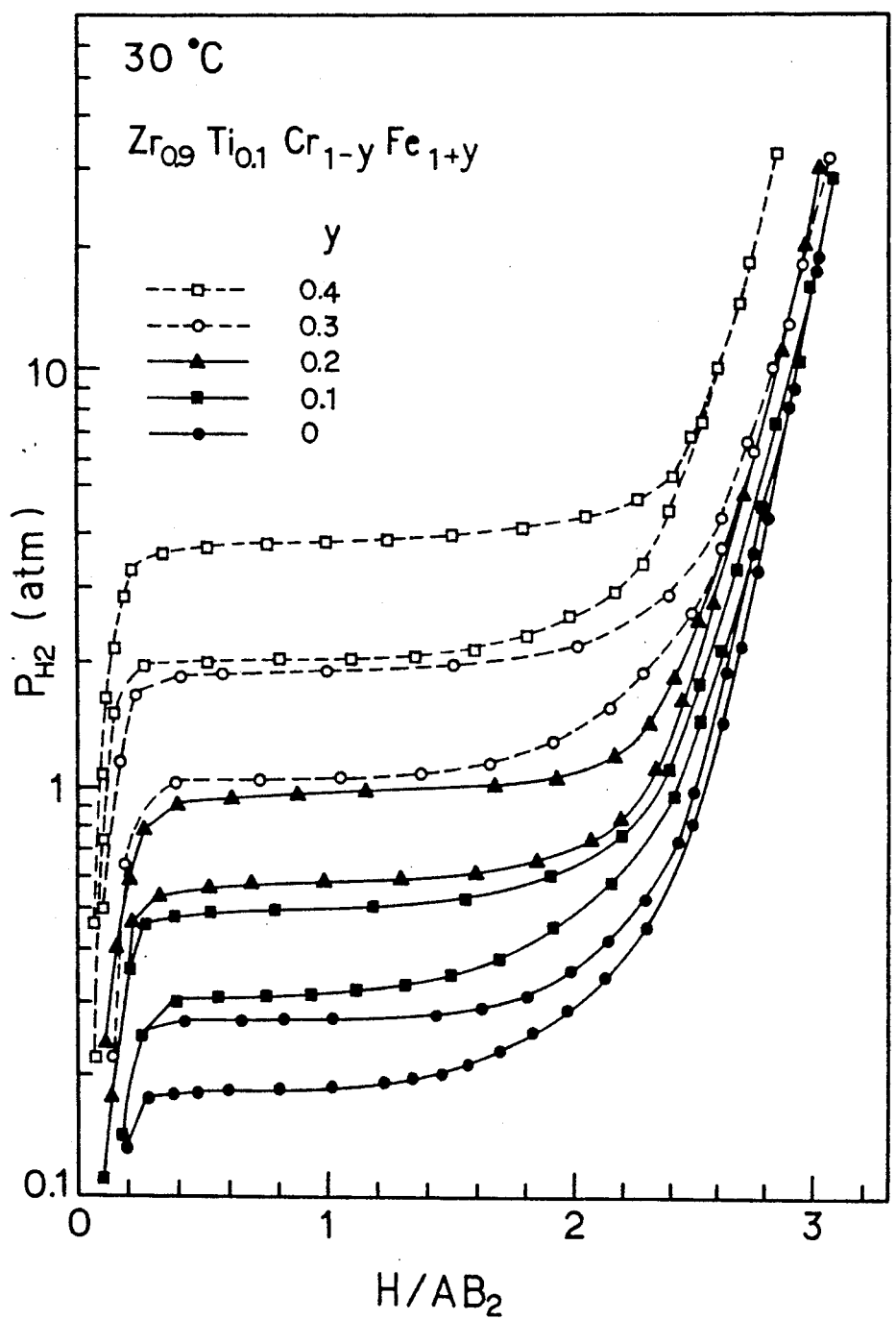
FIG. 2. shows pressure-composition-isotherms for $Zr_{0.9}Ti_{0.1}Cr_{1-y}Fe_{1+y}$ alloys at 30° C.

FIG. 2 illustrates the overall trends in P-C-T curves of $Zr_{0.9}Ti_{0.1}Cr_{1-y}Fe_{1+y}$ alloys for the ranges $0 \leq y \leq 0.4$ in the two-phase region for the hole composition range y. The amount of hydrogen uptake is nearly constant, about 3.0 [H]/[AB$_2$] at 30 atm, up to y=0.3. Increasing iron substitution also does not change the slope of plateau pressure and affects the stabilities of hydride as well as the degree of hysteresis. The measured equilibrium pressures for hydride formation (at [H]/[AB$_2$]=1.0) in these alloys are 0.27 atm for y=0, 0.5 atm for y=0.1, 0.79 atm for y=0.2, 1.9 atm for y=0.3 and 3.8 atm for y=0.4. This indicates that the equilibrium pressure can be accurately controlled by changing the value y without markedly reducing the hydrogen capacity.

The alloys of the invention, as described above, are characterized by good hydrogenation properties such as low hysteresis values and low degree of sloping in P-C-T curve. The hysteresis energies for the $Zr_{0.9}Ti_{0.1}Cr_{1-y}Fe_{1+y}-H_2$ system range from 115 cal/molH at y=0 to 189 cal/molH at y=0.4. These hysteresis values are relatively low considering other metal hydride system, for example, LaNi$_5$[Tanaka, J.Less-Comm.Metals, 89, 169-172 (1983)], FeTi [Lee et al., J. Less-Comm.Metals, 97, 65-71 (1984)] and $ZrMn_{1.22}Fe_{1.11}$[Sinha et al., J. Less-Comm.Metals, 91, 239-249 (1983)] wherein the values are 77, 193 and 545 cal/molH, respectively. The degrees of sloping, as shown in FIGS. 1-2 and Tables I-II, have lowest values of 0.09-0.2 at 5-10% titanium concentration irrespective of iron content y.

Figure 3:
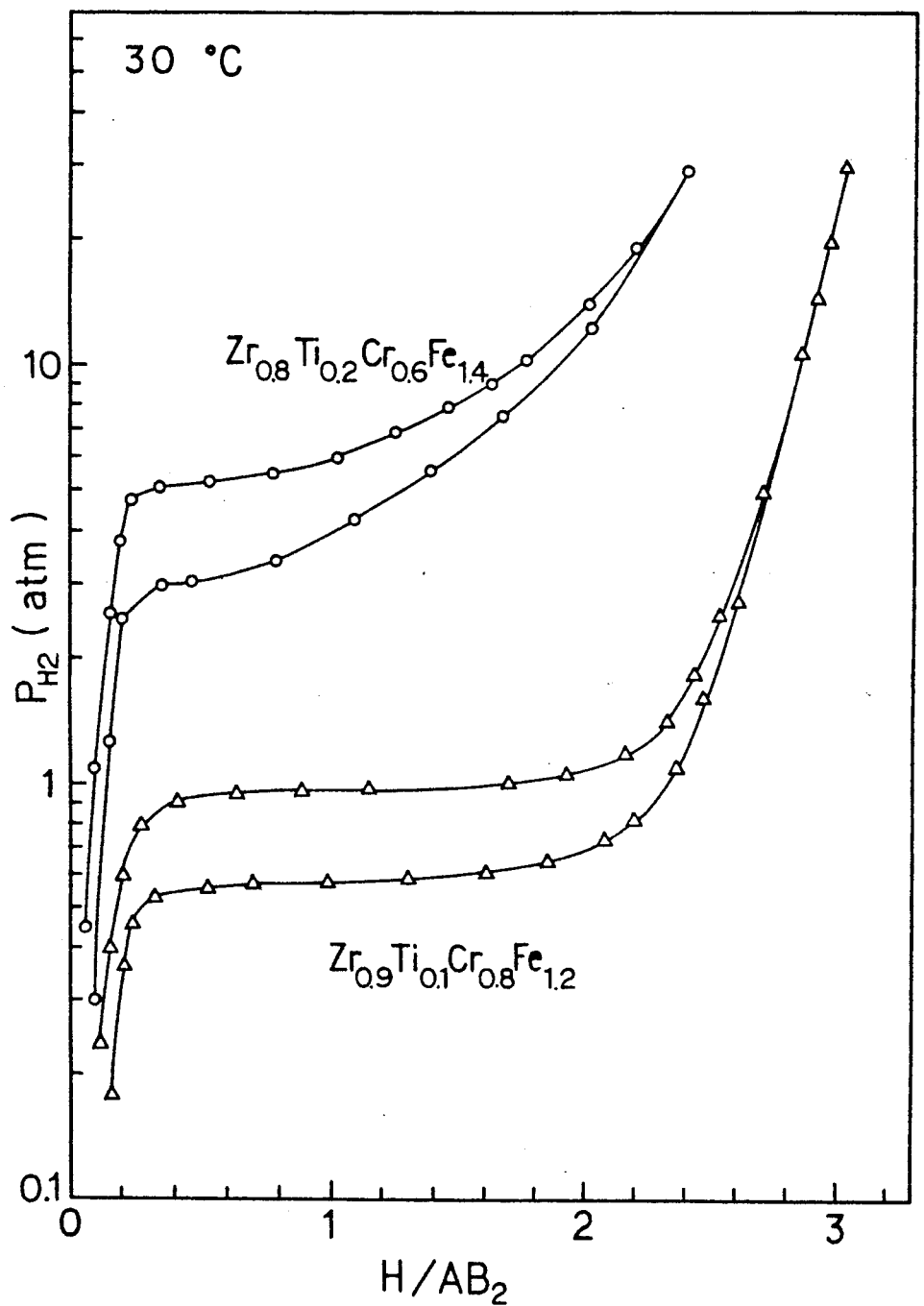
FIG. 3. shows pressure-composition-isotherms for $Zr_{0.9}Ti_{0.1}Cr_{0.8}Fe_{1.2}$ and $Zr_{0.8}Ti_{0.2}Cr_{0.6}Fe_{1.4}$ at 30°.

FIG. 3 shows the difference of P-C-T behavior between $Zr_{0.9}Ti_{0.1}Cr_{0.8}Fe_{1.2}$ alloy of the invention and $Zr_{0.8}Ti_{0.2}Cr_{0.6}Fe_{1.4}$ alloy which is one of the invention in U.S. Pat. No. 4,556,551. According to FIG. 3, the slope degree of $Zr_{0.9}Ti_{0.1}Cr_{0.8}Fe_{1.2}$ alloy is more lower than that of $Zr_{0.8}Ti_{0.2}Cr_{0.6}Fe_{1.4}$ alloy.

Although specific examples of the invention have been set forth hereinabove, it is not intended that the invention be limited solely thereto, but is to include all the variations and modifications falling within the scope of the appended claims.

What is claimed is:

1. Alloys of elements in an atomic ratio are expressed by the formula $$Zr_{1-x}Ti_xCr_{1-y}Fe_{1+y}$$

wherein "x" has a value between 0.05 and 0.1 and "y" has a value of 0 to 0.4 and the alloys $Zr_{1-x}Ti_xCr_{1-y}Fe_{1+y}$ have a P-C-T curve with a degree of sloping of less than 0.45.

2. The hydrides of the alloys $Zr_{1-x}Ti_xCr_{1-y}Fe_{1+y}$ as claimed in claim 1 wherein "x" has a value between 0.05 and 0.1 and "y" has a value of 0 to 0.4.

* * * * *